United States Patent [19]

Davlin

[11] 4,428,603
[45] Jan. 31, 1984

[54] FLANGE UNION WITH IMPROVED METAL-TO-METAL SEALS

[76] Inventor: Irwin H. Davlin, 714 S. Court St., Opelousas, La. 70570

[21] Appl. No.: 214,861

[22] Filed: Dec. 9, 1980

[51] Int. Cl.³ .............. F16L 23/00; F16L 25/00; F16L 13/14; F16L 55/00
[52] U.S. Cl. .................. 285/368; 285/412; 285/334.1; 285/382; 285/93; 285/3
[58] Field of Search ............ 285/363, 368, 405, 412, 285/334.1, 334.4, 382, 261, 93, 3; 138/44

[56] References Cited

U.S. PATENT DOCUMENTS

| | | | |
|---|---|---|---|
| 924,039 | 6/1909 | Clark | 285/363 X |
| 1,468,187 | 9/1923 | Werbeck | 285/363 X |
| 1,924,657 | 8/1933 | Saine et al. | 285/363 X |
| 2,127,501 | 8/1938 | Dall | 138/44 X |
| 2,305,668 | 12/1942 | Bruno | 285/334.4 X |
| 2,687,229 | 8/1954 | Laurent | 285/334.4 X |
| 3,481,633 | 12/1969 | Schopholzer | 285/363 X |
| 3,632,143 | 1/1972 | Lessmann | 285/363 X |
| 4,073,402 | 2/1978 | Wood | 285/3 X |

Primary Examiner—Richard J. Scanlan, Jr.
Attorney, Agent, or Firm—L. S. Van Landingham, Jr.

[57] ABSTRACT

A flange union is disclosed which is provided with inner and outer annular metal-to-metal seals and an optional resilient seal and/or insert. In one embodiment, the two metal-to-metal seals are formed simultaneously, and in another embodiment they are formed sequentially thereby allowing the second to be used as a back-up seal. The configuration of the metal sealing surfaces is such that an annular metal-to-metal line seal of minimum surface area is formed closely adjacent the internal diameter of the bore, and an annular metal-to-metal line seal is formed, or is capable of being formed, outward therefrom. This sealing structure results in markedly less stress and strain on the flange bolts to achieve and maintain the desired sealing pressure. Male-female sealing surfaces mate adjacent the internal diameter of the bore, and the flange union is self aligning in that area. The flange union will seal effectively with the flange members being either in or out of alignment. Inserts are used to extend the life of the flange union and to render it useful for a number of other purposes.

29 Claims, 17 Drawing Figures

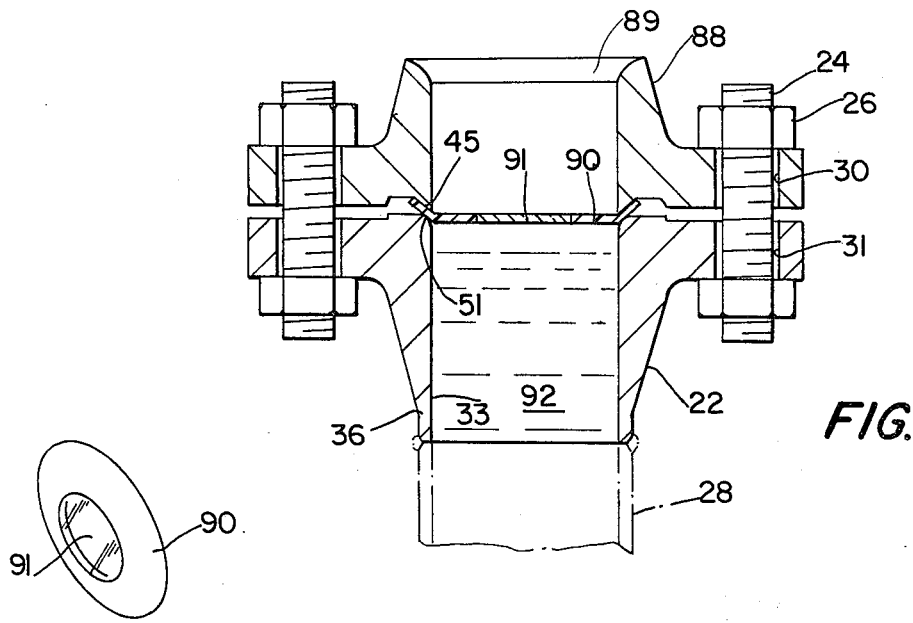
FIG. 16
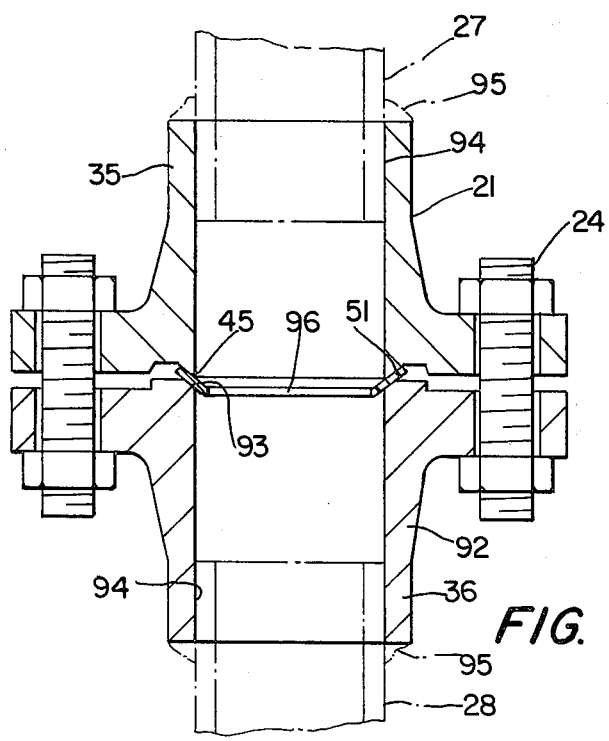
FIG. 16a
FIG. 17

FLANGE UNION WITH IMPROVED METAL-TO-METAL SEALS

THE BACKGROUND OF THE INVENTION

1. The Field of the Invention

The present invention relates to flange unions of the type adapted to join two conduits for fluids and thereby form a conduit joint therebetween. The invention is further concerned with conduit joints including the flange union described and claimed herein, and piping systems comprising one or more of the said flange unions and/or joints.

2. The Prior Art

Flange unions have been used extensively heretofore to detachably join the ends of two conduits and thereby form a continuous length with a separable fluid tight seal or joint therebetween. The resultant structure provides for permanency of the installation when desired and also allows future changes and modifications to be made easily and without demaging or destroying the flange unions, the attached conduits, and/or other cooperating apparatus attached thereto. However, the prior art flange unions have a number of disadvantages and deficiencies which prevent them from being entirely satisfactory in all respects.

For example, one prior art flange union for joining conduits employs a gasket between the opposed terminal inner ends of a pair of flange members and a sealing pressure is applied thereto by means of a plurality of circumferentially spaced bolts. This flange union structure has a large annular sealing area which extends from the internal diameter of the bore outward to the bolts. The total force or pressure that must be exerted on a psi basis by tightening the flange bolts is very great due in part to the large surface area of the seal. Also, the average length of the moment arm that exists between the bolts and the points at which the sealing pressure is applied over the large sealing area is short and the mechanical advantage of the bolts is low. Inasmuch as the flange bolts are under constant stress due, among other reasons, to pressure surges in the conduits, vibration and outside forces applied to the conduits, they wear excessively fast and tend to develop stress cracks which ultimately cause mechanical failure. As a result, it is necessary to replace the bolts in prior art flange unions at frequent intervals. This is a time consuming and costly procedure which has the further disadvantage of lost production as the equipment must be taken off stream during the repairs.

The prior art flange unions described above are not self-aligning and thus are difficult to align properly under the installation conditions which exist on many jobs. They also have the disadvantage of not sealing properly when the flange members are mis-aligned initially, or when the flange members are knocked out of alignment during use. The above prior art flanges are not fire resistant and fail quickly in the event of a fire, they do not have a back-up secondary and/or tertiary seal which may be relied upon in the event of failure of the primary seal, and provision is made for replacable inserts or other means to increase the life of the seal surfaces.

The aforementioned deficiencies and disadvantages of the prior art flange unions have been long recognized by those skilled in this art. However, an entirely satisfactory alternative thereto was not available prior to the present invention in spite of the long existing and great need therefor.

THE SUMMARY OF THE INVENTION

The present invention overcomes the aforementioned and other disadvantages and deficiencies of the prior art. This is accomplished by providing a flange union characterized by the novel and improved design described and claimed hereinafter.

The flange union of the invention may be provided with improved inner and outer annular metal-to-metal seals which have a unique structure for the cooperating opposed sealing surfaces thereof, and also an optional resilient seal and/or insert. In one presently preferred embodiment, the two metal-to-metal seals are formed simultaneously, and in another presently preferred embodiment they are formed sequentially thereby allowing the second to be used as a back-up seal. The cooperating opposed sealing surfaces of the various seals are urged into an effective sealing relationship by applying inwardly directed pressure thereto, such as by tightening the nuts on flange bolts. The configuration of the metal sealing surfaces is such that an annular metal-to-metal line seal of minimum surface area is formed closely adjacent the internal diameter of the bore, and another annular metal-to-metal line seal is also formed, or is capable of being formed, outward therefrom. Much less total force or pressure need be applied to the opposed sealing surfaces to achieve a desired pressure on the line sealing surfaces in terms of pounds per square inch. This sealing structure results in markedly less stress and strain on the flange bolts to achieve and maintain the desired sealing pressure. Male-female sealing surfaces are provided which mate adjacent the internal diameter of the bore, and the flange union is self-aligning in that area and is easy to install. The flange union will seal effectively with the flange members being either in or out of alignment. Low cost replacable inserts are provided which greatly extend the life of the flange union and also render it useful for a number of purposes other than the traditional joining of two conduits.

THE BRIEF DESCRIPTION OF THE ACCOMPANYING DRAWINGS

The invention will be described hereinafter in greater particularity with reference to the presently preferred embodiments thereof illustrated in the accompanying drawings, wherein.

Figure 4:
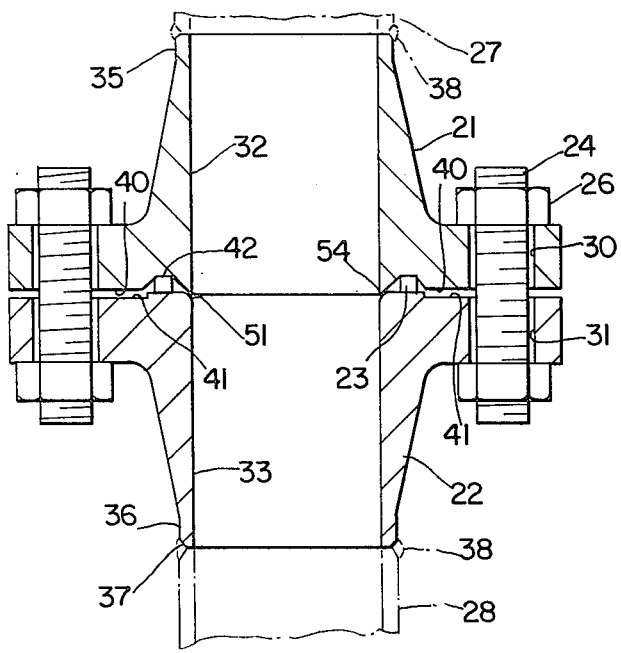
FIG. 4 is a longitudinal cross sectional view taken along the lines 4—4 of FIG. 2.
Figure 6:
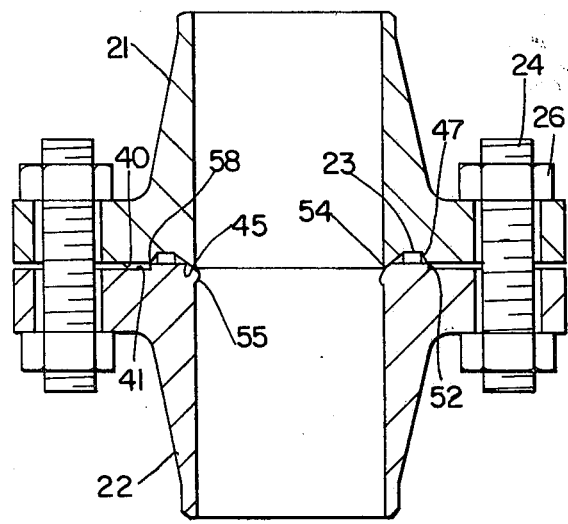
FIGS. 6 and 7 are similar to FIGS. 4 and 5, respectively, with the exception of omitting the packing to thereby form a flange union with greater fire resistance.
Figure 11:
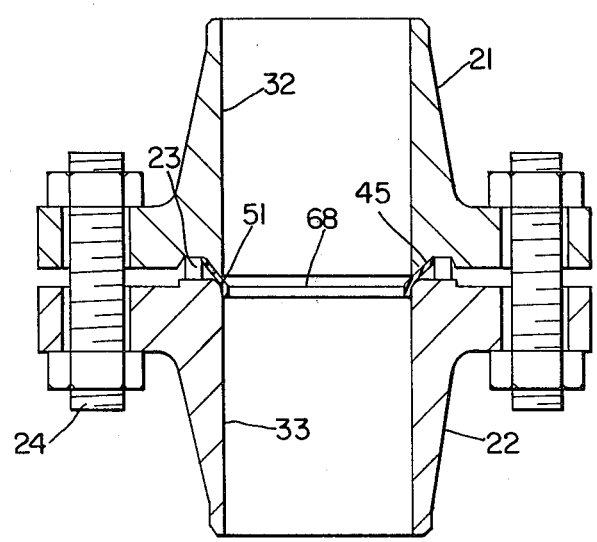
Figure 12:
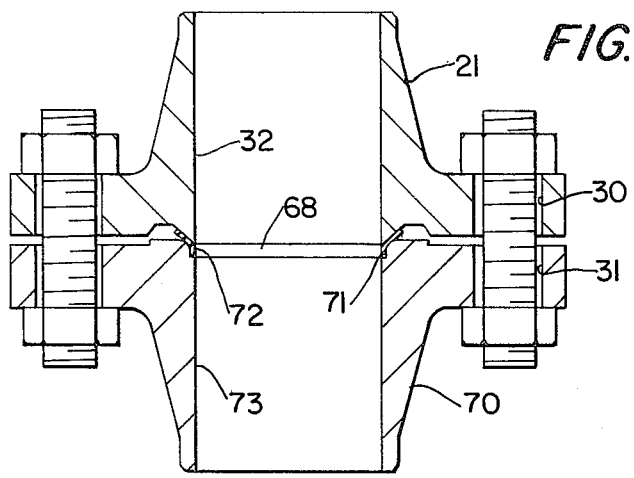
Figure 13A:
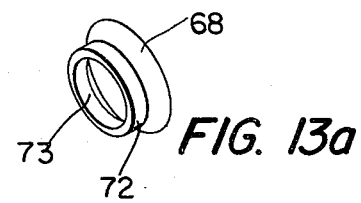
Figure 13:
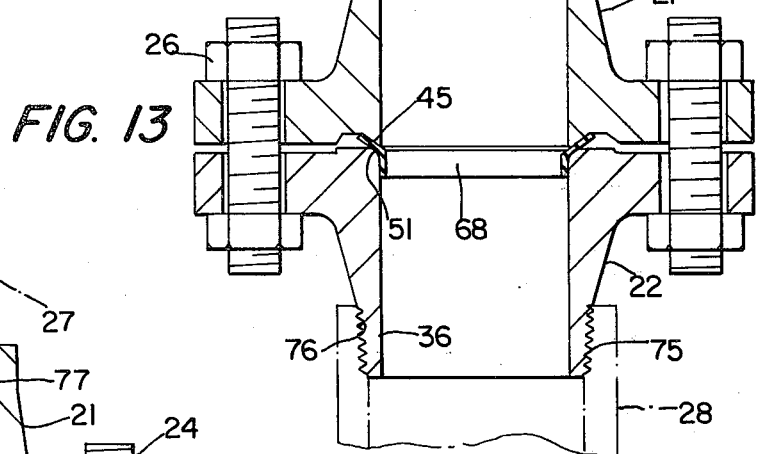
Figure 14:
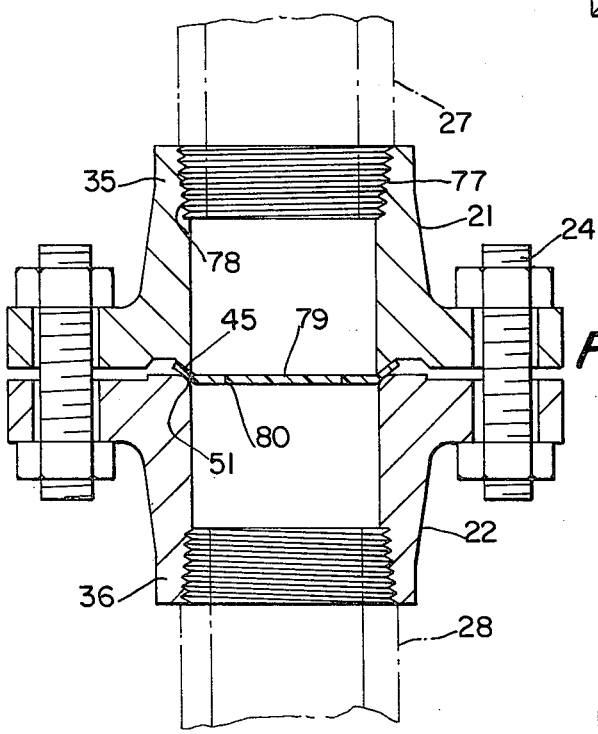
Figure 15:
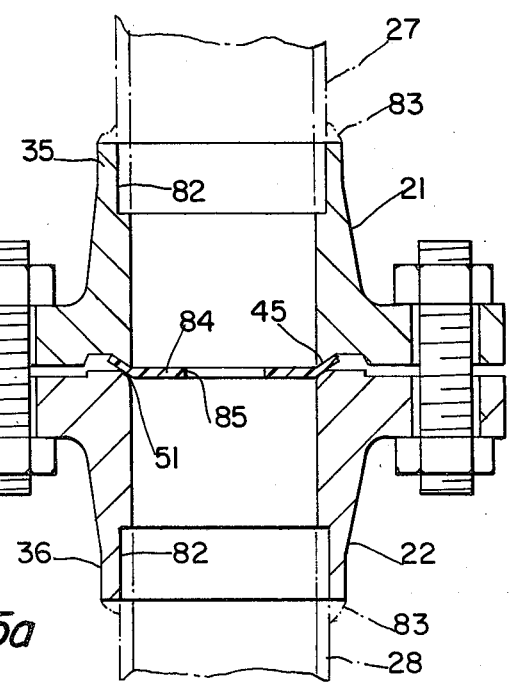
Figure 14A:
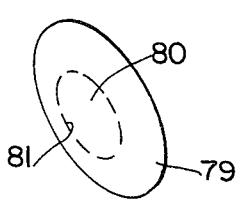
Figure 15A:
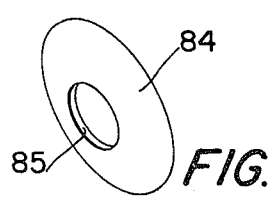

FIG. 11 in a view similar to FIG. 4, but further illustrating the use of an insert between the flange members;

FIG. 12 is a view somewhat similar to FIG. 6, but with the female flange member having an insert mounted therein so as to be flush with the inside diameter of the bore;

FIG. 13 is a view somewhat similar to FIG. 6, but additionally illustrating an insert positioned between the male and female members of the flange union and providing an externally threaded fitting;

FIG. 13-a is a perspective view of the insert illustrated in FIG. 13;

FIG. 14 is a view somewhat similar to FIG. 6, but further showing a frangible insert positioned between the male and female members of the flange union and providing an internally threaded fitting;

FIG. 14-a is a perspective view of the frangible insert illustrated in FIG. 14;

FIG. 15 is a view somewhat similar to FIG. 6, but further illustrating a restricted flow type of insert positioned between the male and female members of the flange union and providing a socket weld fitting;

FIG. 15-a is a perspective view further illustrating the restricted flow insert of FIG. 15;

FIG. 16 is a view somewhat similar to FIG. 6, but additionally illustrating a translucent or transparent insert positioned between the male and female members of the flange union;

FIG. 16-a is a perspective view of the insert of FIG. 16; and

FIG. 17 is a longitudinal cross sectional view somewhat similar to FIG. 6, but further illustrating a modification wherein the seats on the female flange members have flat sealing surfaces and an insert is positioned therebetween.

The aforementioned figures of the drawings are referred to and discussed below in the detailed description of the invention. In the interest of simplifying the discussion, the same numerals are given to identical components and/or portions thereof throughout the various figures.

THE DETAILED DESCRIPTION OF THE INVENTION INCLUDING THE PRESENTLY PREFERRED VARIANTS AND EMBODIMENTS THEREOF

Figure 1:
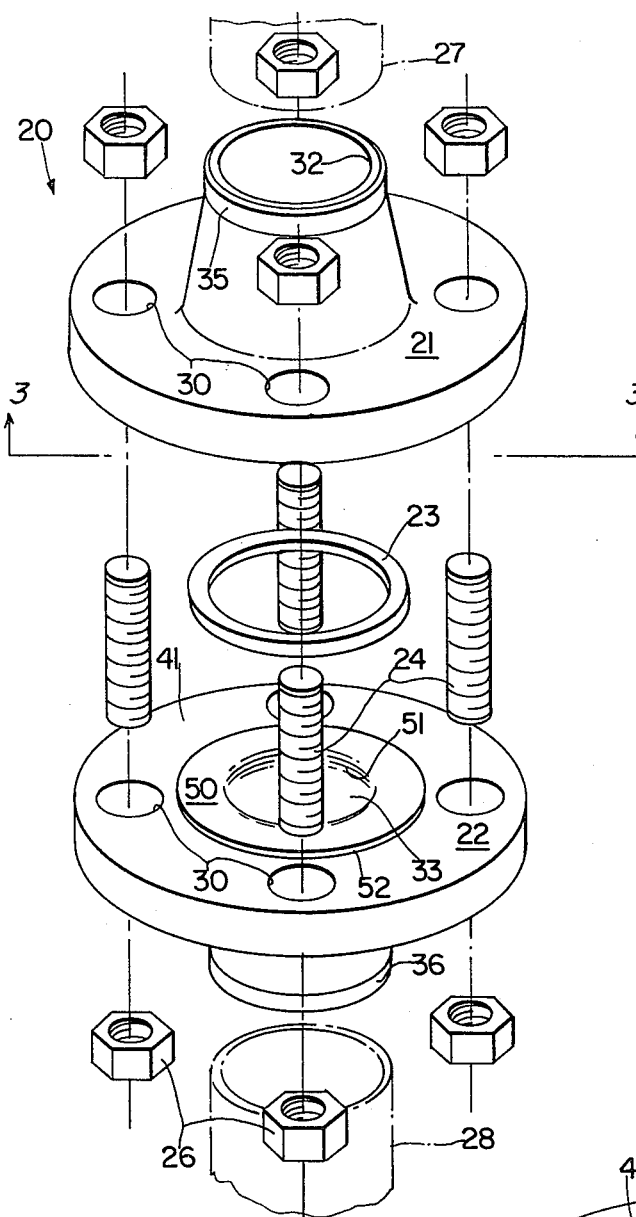
FIG. 1 is an exploded perspective view of the flange union of the invention and the two conduits to be joined thereby, the latter being shown in phantom line.
Figure 2:
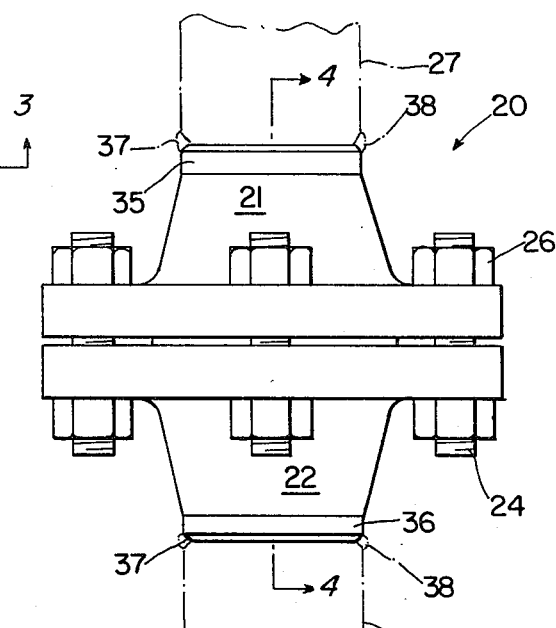
FIG. 2 is a side view in elevation of the assembled flange union of the invention and two conduits joined thereby, the latter being shown in phantom line.

Referring now to FIGS. 1-4 of the drawings, which illustrate one presently preferred embodiment of the invention, the flange union generally designated as 20 includes flange members 21 and 22, packing 23, threaded bolts 24 and nuts 26. The conduits 27 and 28 are illustrated in phantom line for purposes of clarity and simplification of the drawings. FIGS. 2 and 4 of the drawings illustrate the flange union 20 of FIG. 1 in assembled form, and with the conduits 27 and 28 attached thereto to thereby form a fluid tight conduit joint.

The flange members 21 and 22 are provided with openings 30 and 31, respectively, which are spaced circumferentially at equal distances so as to be in alignment when properly positioned. The openings 30 and 31 have internal diameters which are substantially larger than the outside diameters of bolts 24, and the nuts 26 are sufficiently large so that they bridge over the openings 30 and 31 and extend outward from the internal diameters thereof a substantial distance. The bores 32 and 33 in flange members 21 and 22, respectively, have substantially the same internal diameters. The outer ends 35 and 36 may be joined to conduits 27 and 28, respectively, by any suitable conventional means such as by providing butt weld, socket weld, "slip-on" or threaded fittings. In the embodiment illustrated in FIGS. 1-4, the ends 35 and 36 terminate in bevels 37 having a suitable configuration for butt welding conduits 27 and 28, respectively, thereto by means of welding bead 38.

Figure 3:
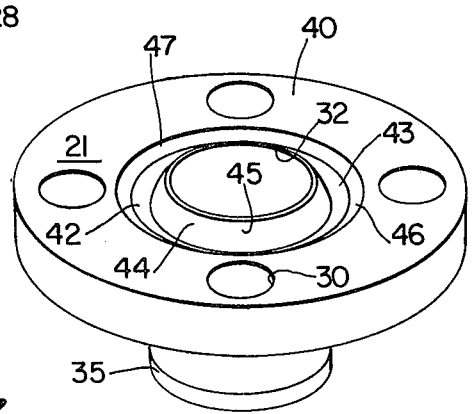
FIG. 3 is a perspective view illustrating the hidden inner end of the upper flange member of FIG. 1.

The inner ends of flange members 21 and 22 have opposed flat terminal surfaces 40 and 41, respectively, which have critical configurations for the purposes of the present invention. As is best seen in FIGS. 3 and 4, the terminal inner end surface 40 has an annular groove 42 formed therein of unusual configuration. The groove 42 includes a flat annular surface area 43 which is substantially parallel to the surface 40 and spaced outward a substantial distance from the surface 40 and the internal diameter of bore 32. An annular protrusion 44 having an annular convex sealing surface 45 of decreasing outer diameter commences at the annular inner edge of the surface area 43, then slopes toward the surface 40 and toward the internal diameter of bore 32, and finally terminates substantially past the surface 40 at the internal diameter of bore 32. The groove 42 includes annular bevel 46 which commences at the annular outer edge of the surface area 43, then slopes toward the surface 40 and away from the internal diameter of bore 32, and finally terminates at the surface 40. The bevel 46 provides a straight sealing surface 47 for sealing engagement with angular annular sealing edge 52.

The terminal inner end surface 41 is provided with a raised annular shoulder area 50 which is flat and substantially parallel to the terminal inner end surface 41. The annular inner edge of shoulder 50 terminates in an annular convex sealing surface 51, and the annular outer edge of shoulder 50 terminates in an angular annular sealing edge 52.

As is best seen in FIG. 4, when the flange members 21 and 22 are properly positioned with their surfaces 40 and 41 being in opposed relationship, the male convex sealing surface 45 is in contact with the female convex sealing surface 51, and the internal diameters of the bores 32 and 33 are in alignment. Additionally, the openings 30 and 31 are in alignment and the threaded bolts 24 are inserted therethrough and the nuts 26 tightened thereon. Upon applying sufficient force or pressure to the convex sealing surfaces 45 and 51 by tightening nuts 26 on bolts 24, a primary fluid tight annular metal-to-metal seal is formed. In addition thereto, the packing 23 is compressed and a secondary fluid-tight annular seal is formed thereby externally of the primary metal-to-metal seal. When the flange members 21 and 22 are thus positioned, it may be seen that the protrusion 44 has a length whereby the surfaces 40 and 41 are maintained in a close but spaced relationship. Also, the surfaces 40 and 41, the surface of area 43, and the surface of shoulder 50 are substantially parallel. Additionally, the line seal formed at 54 between sealing surfaces 45 and 51 is closely adjacent the internal diameters of the bores 232 and 33 and is spaced outward only slightly therefrom. Finally, the angular sealing surface 52 is positioned whereby it will contact the sealing surface 47 of bevel 46 when the nuts 26 on threaded bolts 24 are further tightened to pull surfaces 40 and 41 toward each other sufficiently to form a tertiary metal-to-metal seal.

Figure 5:
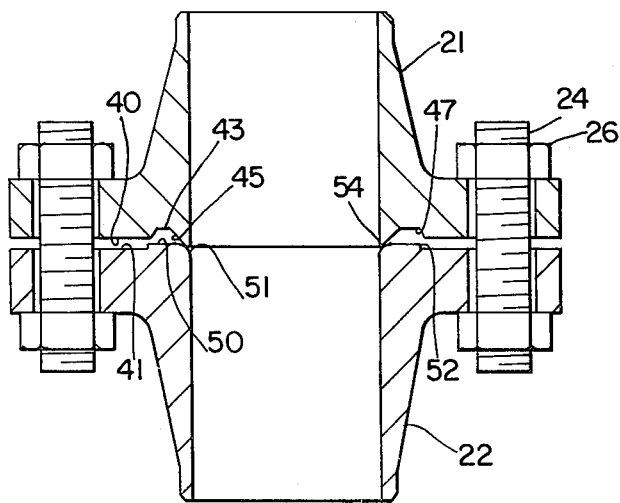
FIG. 5 is a longitudinal cross sectional view similar to FIG. 4, but with the nuts on the bolts being tightened sufficiently to form a double metal-to-metal seal therefrom.

FIG. 5 of the drawings illustrates the formation of a tertiary metal-to-metal seal between the sealing surfaces 47 and 52. This is accomplished by tightening the nuts 26 on bolts 24 until the surfaces 40 and 41 move from the positions illustrated in FIG. 4 to the positions illustrated in FIG. 5. The softer metal of the shoulder 50 is caused to flow as illustrated at 55 as the sealing surface 45 moves thereinto. Also, the angular sealing edge 52 is brought into sealing contact with the straight sealing surface 47, thereby forming a tertiary metal-to-metal line seal. The secondary resilient seal is also strenghtened. It may be noted that the packing 23 of FIG. 5 occupies a much smaller volume than in FIG. 4 and thus has been compressed to form a tighter resilient seal.

Figure 7:
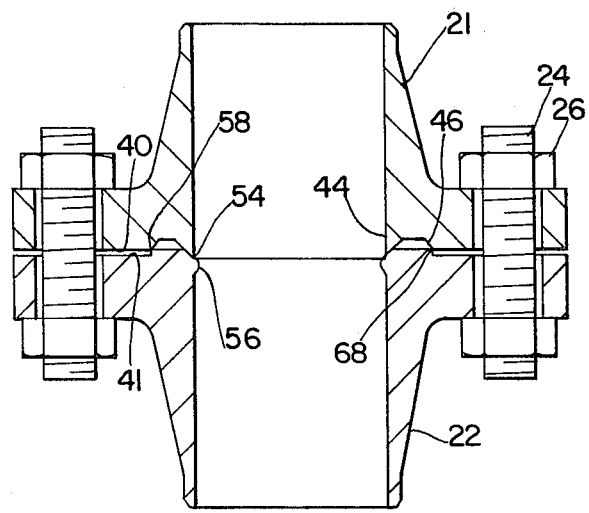

The embodiment of FIGS. 6 and 7 omits the packing 23 of FIGS. 1-5. While the secondary resilient seal is lost thereby, fire resistance is gained. This embodiment of the invention is especially useful in instances where a maximum degree of fire resistance is of importance. In FIG. 6, the primary metal-to-metal seal 54 between the sealing surfaces 45 and 51 is being relied upon and the potential metal-to-metal seal 58 between the sealing surfaces 47 and 52 is being held in reserve as a backup seal. So long as the primary seal 54 is adequate, then the backup seal 58 is not needed. However, if the primary seal 54 should fail or if it is desired to provide a maximum degree of protection, then the nuts 26 on bolts 24 are tightened as described previously in the above discussion of FIGS. 4 and 5, and as is further illustrated in FIG. 7 for the embodiment of FIG. 6. Upon reference to FIG. 7, it may be noted that upon tightening the nuts 26 on bolts 24, the softer metal of the shoulder area 50 is caused to flow as is illustrated at 56 as the surfaces 40 and 41 move closer together. Additionally, the nuts are tightened until the angular sealing surface 52 is in sealing contact with the sealing surface 47 to thereby form a second metal-to-metal seal at 58. The existing seal at 54 is much tighter, and thus a maximum amount of protection is provided thereby and by the seal at 58.

Figure 8:
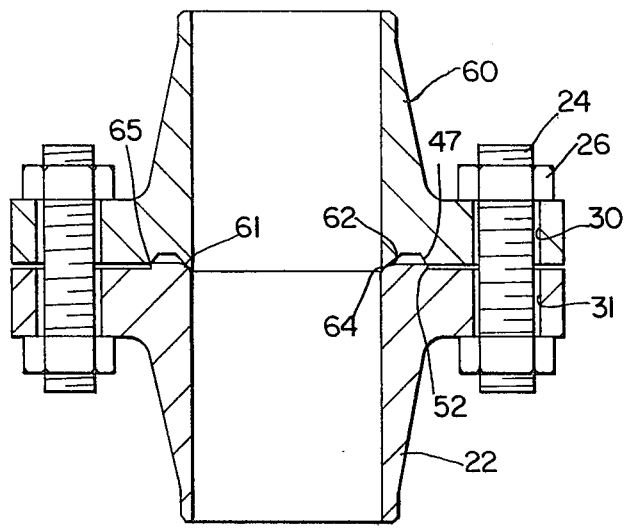
FIG. 8 is a longitudinal cross sectional view somewhat similar to FIG. 6, but illustrating a modification thereof wherein double metal-to-metal seals are obtained simultaneously rather than sequentialy upon tightening the nuts on the bolts.

FIG. 8 illustrates a modification of the previously discussed embodiment of the flange union of the invention. In the embodiment of FIGS. 1-7, the two metal-to-metal seals are formed sequentially and the second metal-to-metal seal is held in reserve as a backup seal. In FIG. 8, both of the metal-to-metal seals are formed simultaneously. This is accomplished by substituting the modified flange member 60 for the flange member 21 of FIGS. 1-7 and retaining flange member 22. The flange member 60 differs from flange member 21 in the length of annular protrusion 61 and the configuration of the convex sealing surface 62 therefor. As may be noted upon reference to FIG. 8, the length of the protrusion 61 and the configuration of the sealing surface 62 are such that a metal-to-metal line seal 64 is formed therebetween simultaneously with the formation of the line seal 65 between the sealing surfaces 47 and annular edge 52. This embodiment of the invention avoids the metal flow illustrated at 55 and 56 in FIGS. 5 and 7 and the accompanying damage to the sealing surface 51. Thus, in instances where there is a requirement for a double metal-to-metal seal, and where a backup seal is not of importance, the embodiment of FIG. 8 is often preferred. This embodiment is especially fire resistant as the packing 23 is omitted and the double metal-to-metal seal will prevent loss of combustible fluid in the event of a fire.

Figure 9:
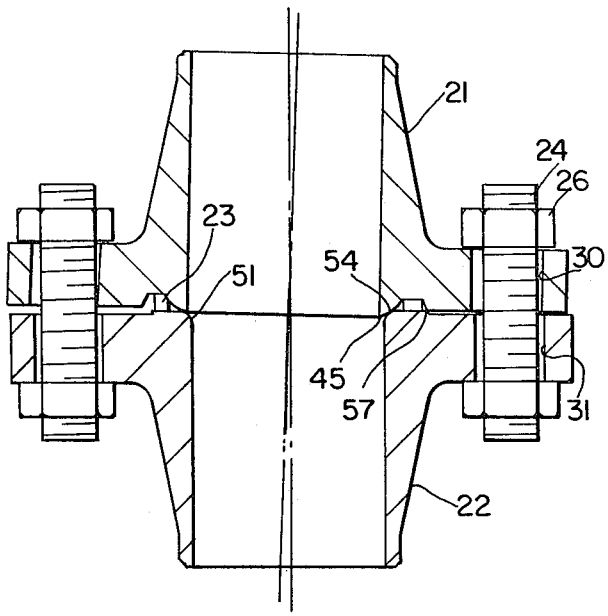
FIG. 9 is a view similar to FIG. 4, or FIG. 6 with added packing, further illustrating the flange members in a moderately misaligned position.
Figure 10:
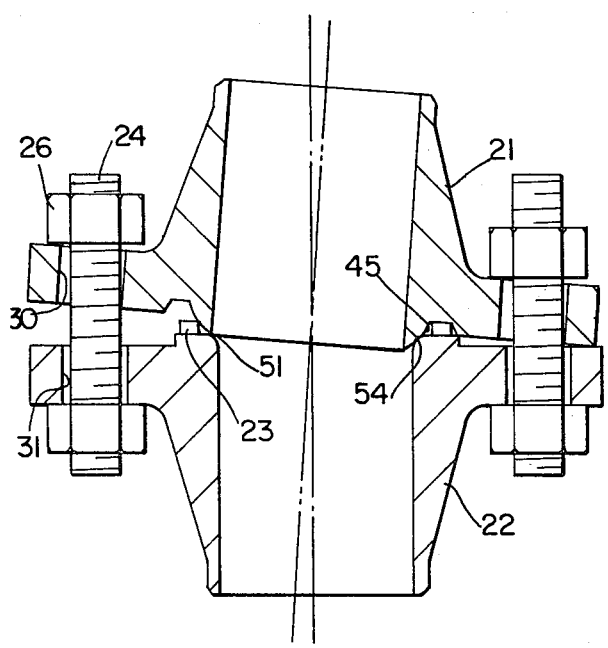
FIG. 10 is a view similar to FIG. 9, but further illustrating the flange members in a markedly misaligned position.

The flange union of the invention is capable of sealing when the flange members 21 and 22, or 60 and 22, are in either the aligned position illustrated in FIGS. 1-8 and 11-17, or in the misaligned positions illustrated in FIGS. 9 and 10. This is an important feature of the present invention as the primary metal-to-metal seal 54 or 64 may be maintained in the event that the flange union is subjected to upsetting outside forces which result in misalignment.

Referring now to FIG. 9, it may be noted that the flange members 20 and 21 are misaligned to a moderate degree. However, due to the openings 30 and 31 having substantially larger internal diameters than the outside diameters of bolts 24, there is sufficient unoccupied space for the bolts 24 to move relative to the centerlines of the openings 30 and 31 without placing any substantially increased stress or strain thereon. Additionally, the sealing surfaces 45 and 51 are capable of moving relative to each other and an effective line seal is maintained therebetween as the flange members 21 and 22 are moved from the aligned position of FIG. 4 or 6 to the misaligned position of FIG. 9. The resilient seal or packing 23 also remains effective in FIG. 9, and thus neither the primary metal-to-metal seal 54 nor the secondary resilient seal or packing 23 is adversely affected by moderate misalignment. This feature is unique in the flange union art and it offers many practical advantages in the field as it is no longer necessary to achieve perfect alignment.

FIG. 10 illustrates a marked misalignment between the flange members 21 and 22, and it further illustrates the unique structure of the present invention which allows the seal 54 to be maintained while also tending to prevent the seal 54 from being broken due to an excessive degree of misalignment. It may be noted that the flange members 21 and 22 are sufficiently out of alignment to cause the bolts 24 to bind in the openings 30 and 31. This feature aids in preventing excessive misalignment which might otherwise result in loss of the seal 54. The binding of the bolts 24 in the openings 30 and 31 occurs after the resilient seal or packing 23 is no longer effective, but before the metal-to-metal seal 54 is broken. This embodiment of the invention is especially important in instances where the conduit system is struck with sufficient force to cause the flange members 21 and 22 to misalign enough to break the primary metal-to-metal seal 54, but not with sufficient force to break the bolts 24.

FIG. 11 illustrates a further modification of the embodiment illustrated in FIGS 1-4. In the embodiment of FIG. 11, the replaceable metal insert 68 shown in FIGS. 13a is positioned between the sealing surfaces 45 and 51 and a seal is formed therebetween. Inasmuch as the insert 68 is constructed from a metal which is softer than the metal used in sealing surfaces 45 and 51, it prevents damage thereto and thus greatly extends the life of the flange union 20.

FIG. 12 illustrates a further modification which is somewhat similar to that of FIG. 11. However, in the embodiment of FIG. 12, the female flange member 70 has been substituted for the female flange member 22 of FIGS. 1-4, and flange member 21 has been retained. Flange member 70 differs from flange member 22 in that an annular recess 71 is provided which receives the annular portion 72 of sealing member 68. The recess 71 is of a configuration and depth whereby the internal diameter of annular portion 72 is flush with the internal diameters of bores 32 and 73. This avoids unnecessary turbulence and increases the rate of flow as the bores 32 and 73 in FIG. 12 are not restricted as is true of the bores 32 and 33 in FIG. 11. This embodiment of the invention offers substantial advantages and is often preferred when an insert is used.

FIGS. 13, 14, 15 and 16 illustrate further modifications of the embodiment of FIG. 6. In the embodiment of FIG. 13, the outer end portions 35 and 36 have been modified to provide external threads 75 which receive the internal threads 76 on conduits 27 and 28, respectively, in threaded engagement. Similarly, in the embodiment illustrated in FIG. 14, the outer end portions 35 and 36 of FIG. 6 have been modified to provide internal threads 77 which are in threaded engagement with external threads 78 on conduits 27 and 28, respectively. Additionally, in the embodiment of FIG. 13, an insert 68 has been provided as previously discussed for FIG. 11 and for the same purposes as discussed therein. In the embodiment of FIG. 14, a frangible insert 79 having a weakened annular interior portion 80 is positioned between the sealing surfaces 45 and 51 as previously discussed for insert 68 of FIG. 11. However, the frangible insert 79 is for the purpose of preventing flow of fluids through the flange 20 under normal conditions of pressure. In the event that the pressure within the conduit system increases to an unacceptably high level, then the weakened portion 80 ruptures and fluid is allowed to escape through the resultant opening 81 until the pressure is released.

In the embodiment illustrated in FIG. 15, the outer end portions 35 and 36 have been modified to provide socket weld fittings 82 which receive the conduits 27 and 28. The conduits 27 and 28 are retained in the socket weld fittings 82 by means of weld beads 83. The restricted flow insert 84 of FIG. 15-a is positioned between the sealing surfaces 45 and 51 in a manner analogous to insert 68 in FIG. 11. The insert 84 is provided with an opening 85 having a substantially smaller internal diameter which restricts the rate of flow of fluid through the flange 20. By selecting an insert 84 having an opening 85 of a desired internal diameter, then any desired desired rate of flow may be maintained.

FIGS. 16 and 16-a illustrate a further embodiment of the invention. In FIG. 16, flange member 88 has been substituted for flange member 21 of FIG. 6. Flange member 88 differs from flange member 21 in that the outer end 35 has been removed, and a bevel 89 has been provided having a configuration adapted to serve as a peephole. The flange member 22 and the remaining components have been retained. An insert 90 having a transparent annular center portion 91 is positioned between the sealing surfaces 45 and 51 as previously discussed for insert 68 in FIG. 11. The bore 33 is normally filled with fluid, and the condition thereof may be observed by placing the eye on bevel 89 and looking through the transparent portion 91 of insert 90. This embodiment of the invention is unique, and it is a marked departure from the traditional use of a flange union solely for the purpose of joining conduits.

FIG. 17, illustrates a further modification of FIG. 6 wherein the flange member 22 has been replaced by flange member 92, and flange member 21 has been retained. Flange member 92 differs from flange member 22 by providing a straight sealing surface 93 rather than convex sealing surface 51. An insert 96 is positioned between the sealing surfaces 45 and 93 in a manner analogous to insert 68 as previously discussed in FIG. 11. It is possible to achieve a good seal with the combination of a convex sealing surface 45 in combination with the straight sealing surface 93. However, often the use of convex sealing surfaces is preferred. The ends 35 and 36 have been modified to provide "slip on" fittings 94 which receive the conduits 27 and 28, respectively. The conduits 27 and 28 are retained in the "slip on" fittings 94 by means of weld beads 95.

The configuration of the sealing surfaces 45 and 51 is such that an annular metal-to-metal line seal 54 of minimum surface area is formed closely adjacent the internal diameter of the bores 32 and 33. As a result, the moment arm that exists between the bolts 24 and the point at which the sealing pressure is applied approaches the maximum possible length, and in turn the mechanical advantage of the bolts 24 approaches the maximum possible value. Additionally, inasmuch as the configuration of the sealing surfaces 45 and 51 is such that a fine line seal is achieved, the present invention simultaneously provides a minimum seal area. The maximization of the mechanical advantage of the flange bolts 24 and minimization of the seal area permits a markedly lower total pressure or force to be applied to the seal surfaces 45 and 51 to provide a desired pressure thereon in terms of pounds per square inch. This, in turn, results in markedly less stress and strain on the flange bolts 24 when maintaining a given desired sealing pressure. Flange bolts 24 having the substantially smaller outside diameters illustrated in the drawings may be used in the openings 30 and 31, thereby providing the additional room or play required for the misalignment feature discussed in connection with FIGS. 9 and 10.

Since the total force or pressure that must be exerted by tightening the flange bolts is much less in the present invention, the undersized bolts 24 are not too small when used with flange union 20. The increased mechanical advantage requires less strain on the bolts 24 to maintain an effective sealing pressure when the flange union 20 is subjected to the constant stress characteristic of day to day operation, which is due, among other reasons, to pressure surges in the conduits, vibration, and outside forces applied to the conduits. The bolts 24 are thereby prevented from wearing excessivly fast and they do not tend to develop stress cracks which would ultimately cause mechanical failure. It is not necessary to replace the bolts 24 at frequent intervals, as was true of the prior art flange unions, and this time consuming and costly procedure is avoided.

The flange union 20 is self aligning. This is a further important advantage as flange union 20 may be aligned easily under the difficult installation conditions which exist on many jobs. Even if there is some misalignment initially, or the flange members are knocked out of alignment during use, the flange union 20 will still seal properly. In instances where a pair of conduits to be joined are not in proper alignment due to a construction error, often it is still possible to join the misaligned conduits. This is a further important advantage as it is not necessary to go to the expense of removing the faulty construction and then correct the error with new construction.

When a fire resistant flange union 20 is not of importance, an annular resilient packing or seal 23 may be employed as a secondary seal. When desired, two or more of such resilient seals having different diameters may be used. When fire resistance is of importance, then usually it is preferred to omit the resilient seal and retain only the metal-to-metal seals 54 and 58.

The foregoing detailed discussion and the accompanying drawings are for purposes of illustration only, and are not intended as being limiting to the spirit or scope of the appended claims. It is understood that equivalent structures may be substituted for those specifically disclosed herein, and that equivalent materials of construction may be employed in addition to those specifically mentioned.

I claim:

1. A flange union comprising first and second cooperating flange members having inner and outer ends and alignable annular bores extending longitudinally therethrough which serve as a passageway for fluid, the said first flange member having an annular groove formed in its terminal inner end surface, the said groove having abottom annular surface with inner and outer edges extending around the terminal inner end of the bore in the first flange member and being spaced outward therefrom a substantial distance, an annular protrusion extending axially beyond said terminal inner surface and having an annular first sealing surface thereon of decreasing diameter, the said annular protrusion commencing at said inner edge of the bottom annular surface of the said groove and sloping toward the terminal inner end surface of the first flange member and terminating substantially at the internal diameter of the bore thereof, an annular bevel extending around the bore in the first flange member and being spaced therefrom, the said bevel commencing at said outer edge of the bottom annular surface of the said groove and sloping toward the terminal inner end surface of the first flange member and away from the internal diameter of the bore thereof, the said bevel terminating at the said terminal inner end surface of the first flange member and having an annular second sealing surface thereon, the terminal inner end surface of the second flange member having an annular shoulder which surrounds the said bore therein, the annular inner edge of the said shoulder terminating in an annular third sealing surface which cooperates with the said first sealing surface, the annular outer edge of the said shoulder terminating in an annular angular fourth sealing surface which cooperates with the said second sealing surface, the said first and second flange members being positioned whereby their respective bores are in communication and the terminal inner end surfaces thereof are opposite each other and whereby the said first and third sealing surfaces and the said second and fourth sealing surfaces are arranged in an opposed relationship, and means carried by the said first and second flange members for applying inwardly directed force to the said first and third opposed sealing surfaces and the said second and fourth opposed sealing surfaces to thereby urge the same into effective first and second sealing relationships respectively and thereby form first and second annular seals respectively around the said terminal inner ends of each of the said bores and provide a fluid tight passageway for fluid through the flange union.

2. The flange union of claim 1 wherein the said first and third sealing surfaces are convex in configuration whereby the resultant annular line seal around the said terminal inner ends of the bores is formed between opposed convex surfaces to thereby assure that the area of the line seal is minimized.

3. The flange union of claim 1 wherein an annular resilient seal is positioned between the said terminal inner end surfaces of the first and second flange members and the said first and second seals.

4. The flange union of claim 1 wherein the said first and third sealing surfaces and the said second and fourth sealing surfaces are arranged in an opposed relationship whereby the said means for applying inwardly directed force to the said first and third opposed sealing surfaces and the said second and fourth opposed sealing surfaces is effective to cause the said first and second seals to be formed sequentially whereby one of the said first and second seals serves as a back up seal.

5. The flange union of claim 4 wherein the said first and third sealing surfaces are convex in configuration whereby the resultant annular line seal around the said terminal inner ends of the bores is formed between opposed convex surfaces to thereby assure that the area of the line seal is minimized.

6. The flange union of claim 4 wherein an annular resilient seal is positioned between the said terminal inner end surfaces of the first and second flange members and the said first and second seals.

7. The flange union of claim 1 wherein the said means for applying the inwardly directed forces to the said first and third and second and fourth sealing surfaces is a plurality of threaded bolts and nuts mounted in aligned openings in the said first and second flange members and circumferentially around the bores thereof whereby the nuts on the threaded bolts may be tightened or loosened as necessary to provide a desired sealing pressure.

8. The flange union of claim 7 wherein the said aligned openings for the bolts have internal diameters substantially larger than the outside diameters of the bolts whereby the said first and second flange members may be moved in and out of alignment without breaking the said first seal, and the said aligned openings have internal diameters such that the outer surfaces of the bolts bind therein with continued movement out of alignment whereby the said first and second flange members are prevented from moving sufficiently far out of alignment to break the said first seal.

9. The flange union of claim 1 wherein the terminal inner end portion of the bore in the said second flange member has an enlarged internal diameter, the said enlarged internal diameter being of a size and depth to receive an insert positioned between the said first and third sealing surfaces, the insert having an opening therein, and the internal diameter of the insert opening being substantially flush with the internal diameter of the remainder of the said bore.

10. The flange union of claim 1 wherein an annular insert formed from a material softer than the said first and third sealing surfaces is positioned therebetween.

11. The flange union of claim 10 wherein the said insert has an opening therein which is sufficiently large to allow substantially unrestricted flow of fluid through the flange union.

12. The flange union of claim 10 wherein the said insert has an opening therein which is sufficiently small to restrict the flow of fluid through the flange union to a desired rate which is less than the normal flow rate.

13. The flange union of claim 10 wherein the said insert includes frangible means which prevents the flow of fluid through the flange union under normal operating pressure, and the said frangible means is ruptured when the fluid pressure exceeds a predetermined pressure level thereby allowing fluid to flow through the said flange union.

14. The flange union of claim 10 wherein the said insert includes transparent or translucent means which prevents the flow of fluid through the flange union, and the condition of the fluid in the flange union may be viewed through the said transparent or translucent means.

15. A conduit system for transporting fluids comprising a plurality of interconnected conduits and a flange union, the said flange union comprising first and second cooperating flange members having inner and outer ends and alignable annular bores extending longitudinally therethrough which serve as a passageway for fluid, the said first flange member having an annular groove formed in its terminal inner end surface, the said groove having a bottom annular surface with inner and outer edges extending around the terminal inner end of the bore in the first flange member and being spaced outward therefrom a substantial distance, an annular protrusion extending axially beyond said terminal inner surface and having an annular first sealing surface thereon of decreasing diameter, the said annular protrusion commencing at said inner edge of the bottom annular surface of the said groove and sloping toward the terminal inner end surface of the first flange member and terminating substantially at the internal diameter of the bore thereof, an annular bevel extending around the bore in the first flange member and being spaced therefrom, the said bevel commencing at said outer edge of the bottom annular surface of the said groove and sloping toward the terminal inner end surface of the first flange member and away from the internal diameter of the bore thereof, the said bevel terminating at the said terminal inner end surface of the first flange member and having an annular second sealing surface thereon, the terminal inner end surface of the second flange member having an annular shoulder which surrounds the said bore therein, the annular inner edge of the said shoulder terminating in an annular third sealing surface which cooperates with the said first sealing surface, the annular outer edge of the said shoulder terminating in an annular angular fourth sealing surface which cooperates with the said second sealing surface, the said first and second flange members being positioned whereby their respective bores are in communication and the terminal inner end surfaces thereof are opposite each other and whereby the said first and third sealing surfaces and the said second and fourth sealing surfaces are arranged in an opposed relationship, means carried by the said first and second flange members for applying inwardly directed force to the said first and third opposed sealing surfaces and the said second and fourth opposed sealing surfaces to thereby urge the same into effective first and second sealing relationships respectively and thereby form first and second annular seals respectively around the said terminal inner ends of each of the said bores and provide a fluid tight passageway for fluid through the flange union, and means for attaching the said first and second outer ends of the first and second flange members to first and second conduits respectively to be joined by the flange union, the said flange union being installed in the said conduit system as a component thereof and with the interior of the bore of a said flange member thereof being in communication with the interior of at least one of the said conduits 16. A conduit system for transporting fluids in accordance with claim 15 wherein the said first and third sealing surfaces are convex in configuration whereby the resultant annular line seal around the said terminal inner ends of the bores is formed between opposed convex surfaces to thereby assure that the area of the line seal is minimized.

17. A conduit system for transporting fluids in accordance with claim 15 wherein an annular resilient seal is positioned between the said terminal inner end surfaces of the first and second flange members and the said first and second seals.

18. A conduit system for transporting fluids in accordance with claim 15 wherein the said first and third sealing surfaces and the said second and fourth sealing surfaces are arranged in an opposed relationship whereby the said means for applying inwardly directed force to the said first and third opposed sealing surfaces and the said second and fourth opposed sealing surfaces is effective to cause the said first and second seals to be formed sequentially whereby one of the said first and second seals serves as a back up seal.

19. A conduit system for transporting fluids in accordance with claim 18 wherein the said first and third sealing surfaces are convex in configuration whereby the resultant annular line seal around the said terminal inner ends of the bores is formed between opposed convex surfaces to thereby assure that the area of the line seal is minimized.

20. A conduit system for transporting fluids in accordance with claim 18 wherein an annular resilient seal is positioned between the said terminal inner end surfaces of the first and second flange members and the said first and second seals.

21. A conduit system for transporting fluids in accordance with claim 15 wherein the said means for applying the inwardly directed forces to the said first and third and second and fourth sealing surfaces is a plurality of threaded bolts and nuts mounted in aligned openings in the said first and second flange members and circumferentially around the bores thereof whereby the nuts on the threaded bolts may be tightened or loosened as necessary to provide a desired sealing pressure.

22. A conduit system for transporting fluids in accordance with claim 21 wherein the said aligned openings for the bolts have internal diameters substantially larger than the outside diameters of the bolts whereby the said first and second flange members may be moved in and out of alignment without breaking the said first seal, and the said aligned openings have internal diameters such that the outer surfaces of the bolts bind therein with continued movement out of alignment whereby the said first and second flange members are prevented from moving sufficiently far out of alignment to break the said first seal.

23. A conduit system for transporting fluids in accordance with claim 15 wherein the terminal inner end portion of the bore in the said second flange member has an enlarged internal diameter, the said enlarged internal diameter being of a size and depth to receive an insert positioned between the said first and third sealing surfaces, the insert having an opening therein, and the internal diameter of the insert opening being substantially flush with the internal diameter of the remainder of the said bore.

24. A conduit system for transporting fluids in accordance with claim 15 wherein the said conduit attaching means includes a butt weld fitting.

25. A conduit system for transporting fluids in accordance with claim 15 wherein the said conduit attaching means includes a socket weld fitting.

26. A conduit system for transporting fluids in accordance with claim 15 wherein the said conduit attaching means includes male or female threads for receiving the cooperating threaded end of a conduit in threaded relationship.

27. A conduit system for transporting fluids in accordance with claim 15 wherein the said conduit attaching means includes a slip-on fitting.

28. A conduit system for transporting fluids in accordance with claim 15 wherein an annular insert formed from a material softer than the said first and third sealing surfaces is positioned therebetween.

29. A conduit system for transporting fluids in accordance with claim 28 wherein the said insert has an opening therein which is sufficiently large to allow substantially unrestricted flow of fluid through the flange union.

* * * * *